Feb. 25, 1936.  A. Y. DODGE  2,031,762
BRAKE
Filed July 21, 1930  2 Sheets-Sheet 1

INVENTOR.
Adiel Y. Dodge
BY H. O. Clayton
ATTORNEY

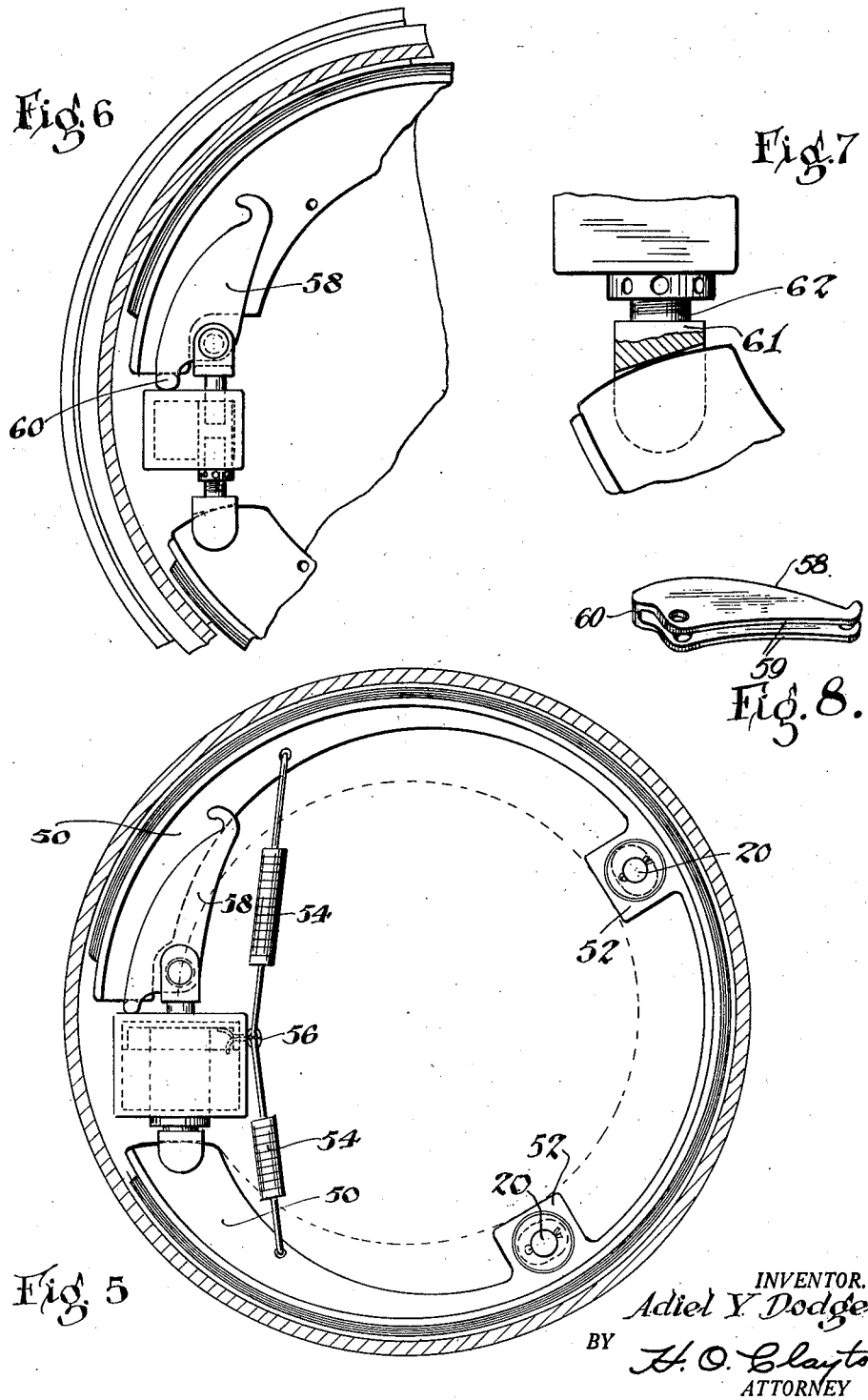

Patented Feb. 25, 1936

2,031,762

UNITED STATES PATENT OFFICE 2,031,762

BRAKE

Adiel Y. Dodge, South Bend, Ind., assignor to Bendix Brake Company, South Bend, Ind., a corporation of Illinois Application July 21, 1930, Serial No. 469,522

28 Claims. (Cl. 188—78)

This invention relates to brakes and is illustrated as embodied in an automotive brake of the internal expanding band type.

The band brake, while admittedly very effective, is nevertheless difficult of control, which is, in the main, due to the appreciable lining clearance necessary, which clearance in turn is in part made necessary by the degree of flexibility of the band. This results in loss of precision of all parts of this type of brake and particularly in the control operating elements, necessitating a very effective type of the latter means. The normal lining wear of a band brake, with the resulting increase in clearance also materially affects the precision and set of the operating parts.

The provision of an effective operating means, which is not particularly sensitive to the looseness of the band brake is therefore highly desirable and to this end I have designed a novel, compact and very rigid mechanism to meet the aforementioned demands.

A further object of my invention resides in the provision of a combined anchor, adjusting and applying mechanism, these functions being affected by a single compact structure. In one desirable arrangement there is provided a hollow anchor or torque member receiving within its confines the adjustable end of the band, which end in turn receives one end of a thrust member mounted on a lever operating member lying without the anchor, which lever member is preferably mounted on the remaining end of the band.

A further object of my invention is to so arrange the aforementioned parts that the hollow anchor or torque reaction member receives the thrust of the brake in either direction of drum rotation from one or the other of the ends of the band which thrust is taken by one side of the anchor member.

Other minor but nevertheless important objects of my invention are concerned with the design of one end of the band to insure its effective contact with the revolving drum, particularly when the brake is first applied; with various modifications of the structure of the band itself in the interests of economical fabrication; and with various other details of construction and combinations of parts which will become manifest upon a reading of the detailed description to follow, taken in consideration with the drawings, in which:

Figure 5 is a view similar to Figure 1 disclosing a modified form of band structure;

Figure 6 discloses a modified form of operating lever;

Figure 7 discloses a partial section of a modified form of connection between the adjustable element of the friction end and the body of the band itself and Figure 8 is a perspective of the brake-applying lever of Figure 5.

Figure 4:
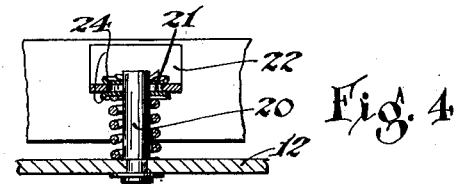
Figure 4 is a section through the stop and guide structure taken on the line 4—4 of Figure 1.

In that embodiment of the invention disclosed in Figures 1 to 4, inclusive, there is provided within the usual rotatable brake drum 10 a brake assembly mounted on the usual support or backing plate 12, which assembly comprises in its essential elements an annular bandlike floating friction element 13 adapted to support any one of the conventional brake linings 14, which band is preferably reinforced at its spaced apart ends by radially extending tapered web or flange portions 16. A return spring 18 is secured to the web portions of the floating band to draw the ends of the same together, rendering the band inoperative and a plurality of combined guide and stop pins 20, disclosed in detail in Figure 4, are provided to pre-determine the path of movement as well as the release position of the band. These pins 20, which are rigidly secured to the backing plate 12 pass at their ends through slots 21 in the inwardly directed flanges of right angle bracket members 22 rigidly secured to the inner face of the band. Spring pressed washers 24, sleeved over the pin and about the slots 21, serve to confine the band laterally in a pre-determined path during the brake applying movement and the lower edge of the slots 21 contact with the pins to determine the released portion of the band.

The important features of my invention relate to the compact arrangement of the adjusting means for the band, together with the applying means and torque block or anchor means. As clearly disclosed in Figures 1 and 2, there is provided a substantially rectangular sectioned or boxlike anchor member 26 protruding outwardly from the face of the support plate 12 and rigidly secured thereto as by welding along the flanged edges of the anchor member. A closure plate 28 detachably secured over the open face of the anchor member serves, upon removal, to render accessible the inside of the anchor member for a purpose hereinafter more fully described.

Figure 1:
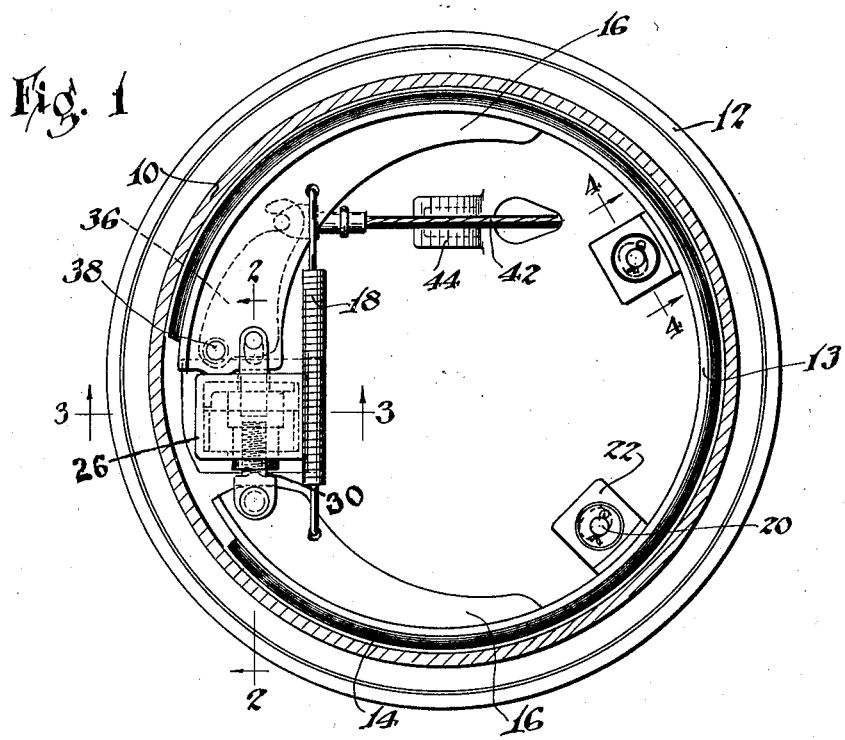
Figure 1 is a view in side elevation of a band type of brake assembly embodying my novel combined anchor adjusting and applying mechanism.
Figure 2:
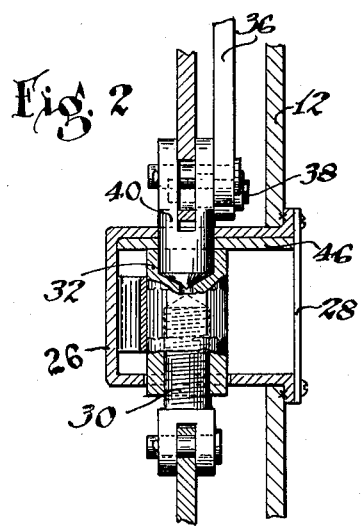
Figure 2 is an enlarged section through the aforementioned mechanism taken on the line 2—2 of Figure 1.
Figure 3:
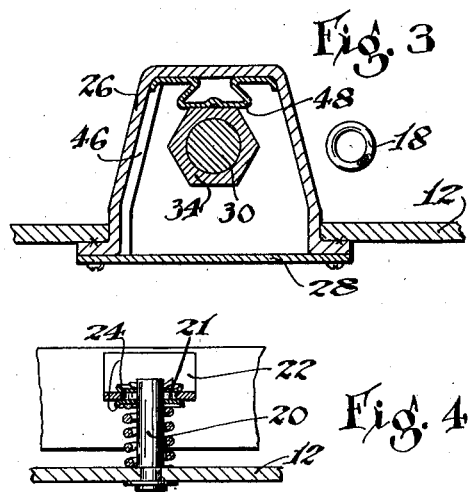
Figure 3 is a section disclosing in detail the construction of the anchor member, taken on the line 3—3 of Figure 1.

To the lower end of the friction band, as seen in Figure 1, I have pivotally secured what may be termed a clevis bolt 30, which bolt threadedly receives a relatively long cylindrical adjusting nut 32 having a hex-shaped central portion 34. The nut is adapted to slide within an opening in the anchor member. The upper end of the band as seen in Figure 1, serves as a mounting for the applying means of the brake preferably comprising a generally triangular shaped lever member 36 pivotally secured at 38 to the end of the band, to which lever is also pivoted the clevised end of a cylindrical thrust member 40, which latter member slides within an opening in the anchor and is received at its end within a cylindrical recess in one end of the aforementioned adjusting bolt member 32, all as clearly disclosed in Figure 2. The upper web 16 is slotted to receive and permit the necessary movement of the pin of the clevised end of member 40.

The lever member 36 is preferably adapted to be actuated, about its initial fulcrum pivot 38, by means of a flexible tension element 42 of cable construction extending within the backing plate 12 and supported by a ramp portion 44 on the plate. The flexible cable member is preferably secured by a clevised fitting on its end to a hook-shaped portion on the end of the lever, as shown in Figure 1.

In operation, actuation of the lever 36 serves to force the thrust member 40 against the adjusting nut 32 on the end of the clevis bolt, the lever acting as one of the second class fulcruming about the pin 38. This movement serves to force the lower end of the shoe into drum engagement against the resistance of the return spring 18 and with the drum rotating counter-clockwise, as indicated by the arrow in Figure 1, the band is wiped around by the action of the rotating drum, the upper end of the band anchoring against the upper end of the anchor 26. With the drum rotating in the clockwise direction during reverse braking, the same applying movement heretofore described takes place. However, the reaction of the brake in this operation is taken by the adjusting nut 32 which abuts an angle shaped reinforcing plate 46 contacting one side face of the anchor member 26.

Compensation for the normal wear of the brake lining is effected by merely rotating the adjusting nut 32, thereby increasing the overall length of the band. This adjustment, however, has no effect whatsoever on either the anchor or the applying means, the set of the latter being thus preserved throughout the life of the brake lining. This adjustment of the nut 32 is readily effected by merely removing the cover plate 28 and, with a suitable wrench, rotating the hex portion of the adjusting nut, the adjustment so effected being preserved by a spring-pressed clip 48 nesting within one face of the anchor member, as clearly disclosed in Figure 3.

In Figure 5 I have disclosed together with my novel applying structure a modified form of band structure fabricated from T-section stock, the web of which is cut away intermediate its ends to provide the tapered end reinforcing web elements 50. There is also left during this cutting operation substantially rectangular shaped flanges or bosses 52 serving as the support for the aforementioned guide and stop pins 20. In this modified form of band, I prefer to vary the retracting spring mechanism to provide two separate springs 54 anchored at their inner ends to a clip member 56 fixedly secured to the anchor member.

I have also suggested in Figure 5 a modified form of lever 58 more clearly disclosed in detail in Figures 6 and 8, the same being provided with a protruding nose portion 60 surrounding the end of the web of the T-section band and adapted to abut the upper end face of the anchor member. This lever 58 is formed from a stamping return bent to provide side members 59 straddling the web 16, which members are provided with hooks at their ends to receive the cable fitting. The remainder of the lever structure is similar with that of Figure 1.

In Figure 7 I have furthermore disclosed a modified form of lower end construction of the band wherein the inclined inner face of the clevis end 61 of an adjusting bolt 62, otherwise described in connection with the assembly of Figure 1, is adapted to straddle and disconnectedly engage the rounded end of the radially extending reinforcing web of the band of Figure 5. With application of the brake the clevis bolt 62 functions to transmit its thrust to the inclined ramp or curved thrust surface of the web member. The inclination of these contacting surfaces is designed to make the movement necessary to apply the brakes in forward braking equal to that required on reverse braking. The aforementioned structure is made necessary by virtue of the shifting of the fulcrum of the applying lever during the aforementioned braking operation.

The various forms of operating mechanism described, together with their structural relation with the anchoring and adjusting structures all contribute to produce a very compact, rigid and economically fabricated operating means for a band brake. Simplicity of adjustment, positive actuation of the friction means and an effective reaction of the torque function is thus effected.

While several illustrative embodiments have been described in detail, it is not my intention to limit the invention to those particular embodiments or otherwise than by the scope of the appended claims.

I claim:

1. A brake structure comprising, in combination, a drum, a fixed anchor member at one side of the drum, a floating expansible bandlike friction device having one of its separable ends confined within the anchor member, applying means outside of the anchor for forcing said ends apart to apply the brake, and an adjustable thrust member forming the end of the friction device extending through the anchor and engaging both the anchor member and said applying means.

2. A brake structure comprising, in combination, a drum, a hollow fixed anchor member at one side of the drum, a floating expansible bandlike friction device having one of its separable ends confined within the anchor member, said confined end forming an adjustable thrust member pivotally mounted to a part of the friction device.

3. A brake structure comprising, in combination, a drum, a hollow fixed anchor member at one side of the drum, a floating expansible bandlike friction device having one of its separable ends confined within the anchor member, a floating applying device for forcing said ends apart to apply the brake, and an adjustable thrust member housed within said hollow anchor member, the same being pivotally mounted on a portion of the friction device and engaging the anchor member and through which the brake torque is transmitted to said anchor member in one direction of drum rotation.

4. A brake comprising, in combination, a drum, a fixed anchorage, a floating friction device having different parts anchoring on said anchorage in opposite directions of drum rotation and which includes adjusting means extending through said anchorage and pivotally mounted on and carried by the friction device for expanding the friction device to compensate for wear, and applying means acting upon the adjusting means, the applying means being unaffected by the adjustment.

5. A brake comprising, in combination, a drum, a fixed anchorage, floating friction means having one part which anchors when the drum is turning in one direction and a different part which anchors when the drum is turning in the other direction, at least one of said parts being adjustable to compensate for wear of the friction means and one of said parts being housed within and anchoring inside of said fixed anchorage.

6. A brake comprising, in combination with a drum, floating friction means having one end part which anchors when the drum is turning in one direction and a different end part which anchors when the drum is turning in the other direction, together with an applying means mounted on one of said end parts and acting through the intermediary of a thrust element on an adjustable part of the second-mentioned end part of the friction means, and a hollow anchorage through which said applying means acts.

7. A brake comprising a boxlike anchor member housing the adjustable end of a friction means anchoring against the inside of said boxlike member and also housing a portion of an applying means for said friction means.

8. A brake comprising an anchor member abutted by a return bent lever member surrounding one end of a friction element of the brake.

9. A brake friction element having an end structure comprising a thrust member including a clevis, the base of the furcations of said clevis being inclined and contacting the end of the friction element.

10. A brake applying device comprising a lever having parallel sides adapted to straddle a shoe web and connected by an integral thrust portion.

11. A brake comprising friction means, anchorage means between the ends of said friction means and having a transverse opening therethrough, and applying means acting on said ends and having a device extending transversely through said opening, said device having means for transmitting the anchoring torque of one of said ends to said anchorage means, and the anchoring torque of the other of said ends being transmitted directly to the anchorage means.

12. A brake comprising friction means, an anchorage between the ends of said friction means, and applying means acting on said ends and having parts extending transversely through the anchorage, together with a wear adjustment for the brake within said anchorage.

13. A brake having a backing plate formed with an opening and having friction means mounted thereon, a hollow anchorage for the friction means arranged over said opening, a wear adjustment for the friction means within said anchorage and operable through said opening from outside of the brake, and applying means acting on the friction means in part through said wear adjustment.

14. A brake comprising a backing plate having friction means with adjacent separable ends mounted thereon and having an anchor arranged between said ends and provided with a transverse opening, one of said ends anchoring directly against the anchor and having pivoted thereon a brake-applying lever arranged in the space between the friction means and the backing plate, operating means for said lever including a tension element passing through the backing plate and connected to said lever, and a connection between said lever and the other of said ends which passes through said transverse opening and which has a part engageable with the anchor and arranged to transmit thereto the anchoring torque of said other end.

15. A brake comprising a backing plate having friction means with adjacent separable ends mounted thereon and having an anchor arranged between said ends and provided with a transverse opening, one of said ends anchoring directly against the anchor and having pivoted thereon a brake-applying lever arranged in the space between the friction means and the backing plate, and a connection between said lever and the other of said ends which passes through said transverse opening and which has a part engageable with the anchor and arranged to transmit thereto the anchoring torque of said other end.

16. A brake comprising a backing plate having friction means with adjacent separable ends mounted thereon and having an anchor arranged between said ends and provided with a transverse opening, one of said ends anchoring directly against the anchor and having pivoted thereon a brake-applying lever arranged in the space between the friction means and the backing plate, operating means for said lever including a tension element passing through the backing plate and connected to said lever, and a connection between said lever and the other of said ends which passes through said transverse opening and which has a part engageable with the anchor and arranged to transmit thereto the anchoring torque of said other end and which part is adjustable to compensate for wear without changing the action of said lever.

17. A brake comprising a backing plate having friction means with adjacent separable ends mounted thereon and having an anchor arranged between said ends and provided with a transverse opening, one of said ends anchoring directly against the anchor and having pivoted thereon a brake-applying lever arranged in the space between the friction means and the backing plate, and a connection between said lever and the other of said ends which passes through said transverse opening and which has a part engageable with the anchor and arranged to transmit thereto the anchoring torque of said other end and which part is adjustable to compensate for wear without changing the action of said lever.

18. A brake comprising a backing plate having friction means with adjacent separable ends mounted thereon and having an anchor arranged between said ends and provided with a transverse opening, one of said ends anchoring directly on the anchor and provided with an applying means with its major portion arranged in the space between the backing plate and said end of the friction means, and a thrust device passing through the transverse opening and connecting the applying means with the other of said ends and through which the other of said ends anchors on said anchor.

19. A brake comprising a backing plate having friction means with adjacent separable ends mounted thereon and having an anchor arranged between said ends, one of said ends anchoring directly on the anchor and provided with an applying means with its major portion arranged in the space between the backing plate and said end of the friction means, and a thrust device connecting the applying means with the other of said ends and through which the other of said ends anchors on said anchor.

20. A brake comprising a backing plate having friction means with adjacent separable ends mounted thereon and having an anchor arranged between said ends and provided with a transverse opening, one of said ends anchoring directly on the anchor and provided with an applying means, and a thrust device passing through the transverse opening and connecting the applying means with the other of said ends and through which the other of said ends anchors on said anchor.

21. A brake comprising a backing plate having friction means with adjacent separable ends mounted thereon and having an anchor arranged between said ends, one of said ends anchoring directly on the anchor and provided with an applying means with its major portion arranged in the space between the backing plate and said end of the friction means, and a thrust device connecting the applying means with the other of said ends and through which the other of said ends anchors on said anchor, said thrust device consisting of a plurality of parts which are relatively adjustable to compensate for wear without interfering with the anchorage of said other end or the action of the applying means.

22. A brake comprising a backing plate having friction means with adjacent separable ends mounted thereon and having an anchor arranged between said ends and provided with a transverse opening, one of said ends anchoring directly on the anchor and provided with an applying means, and a thrust device passing through the transverse opening and connecting the applying means with the other of said ends and through which the other of said ends anchors on said anchor, said thrust device consisting of a plurality of parts which are relatively adjustable to compensate for wear without interfering with the anchorage of said other end or the action of the applying means.

23. Brake anchorage and applying means comprising an anchor member having a transverse opening therethrough, a pivoted applying lever at one side of the anchor member, and a thrust device operatively connected to the lever and passing through the transverse opening and having thrust means for transmitting to the anchor member anchoring torque in a direction toward said lever.

24. Brake anchorage and applying means comprising an anchor member having a transverse opening therethrough, applying means at one side of the anchor member, and a thrust device operatively connected to said means and passing through the transverse opening and having thrust means for transmitting to the anchor member anchoring torque in a direction toward said applying means.

25. Brake anchorage and applying means comprising an anchor member having a transverse opening therethrough, a pivoted applying lever at one side of the anchor member, and a thrust device operatively connected to the lever and passing through the transverse opening and having thrust means for transmitting to the anchor member anchoring torque in a direction toward said lever, said device being adjustable to vary its effective length on the other side of the thrust means from its point of anchoring engagement with said member, to compensate for wear of the brake.

26. Brake anchorage and applying means comprising an anchor member having a transverse opening therethrough, applying means at one side of the anchor member, and a thrust device operatively connected to said means and passing through the transverse opening and having thrust means for transmitting to the anchor member anchoring torque in a direction toward said applying means, said device being adjustable to vary its effective length on the other side of the thrust means from its point of anchoring engagement with said member, to compensate for wear of the brake.

27. Brake anchorage and applying means comprising an anchor adapted to receive anchoring thrust in one direction directly on one side, applying means on said side of said anchor having a part passing through the anchor, and means carried by said part for transmitting to the anchor anchoring torque in the opposite direction.

28. A brake comprising an anchor member having an opening therethrough, friction means having separable ends one of which is engageable with said anchor member, a part passing through said opening and engaging the other of said ends and through which the other of said ends anchors on said member and which has an adjustment to vary its effective length between the anchor member and said other end to compensate for wear, and applying means acting on said one end and on said part to force said ends apart to apply the brake.

ADIEL Y. DODGE.